US012128338B2

(12) United States Patent
Fell et al.

(10) Patent No.: US 12,128,338 B2
(45) Date of Patent: *Oct. 29, 2024

(54) ROTARY VESSEL WITH A RELEASABLE LOCKING DEVICE FOR A FILTER ASSEMBLY

(71) Applicant: MANN+HUMMEL GmbH, Ludwigsburg (DE)

(72) Inventors: Anthony W. Fell, Yeovil (GB); Robin Nash, Langport (GB); Tiago Marques, Leca da Palmeira (PT); Angus Rouse, Leeds (GB); Andy Collins, Taunton (GB); Matthew Slade, Ilminster (GB); Thomas Rowlands, Rhondda Cynon Taf (GB); Nigel Burford, Taunton (GB)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/364,885

(22) Filed: Aug. 3, 2023

(65) Prior Publication Data
US 2023/0381694 A1 Nov. 30, 2023

Related U.S. Application Data

(60) Continuation of application No. 17/657,693, filed on Apr. 1, 2022, now Pat. No. 11,752,457, which is a division of application No. 16/214,097, filed on Dec. 9, 2018, now Pat. No. 11,471,800.

(30) Foreign Application Priority Data

Dec. 8, 2017 (GB) ..................................... 1720492

(51) Int. Cl.
| | | |
|---|---|---|
| *B01D 35/30* | (2006.01) | |
| *B01D 33/11* | (2006.01) | |
| *B01D 35/157* | (2006.01) | |
| *B04B 5/00* | (2006.01) | |
| *B04B 7/08* | (2006.01) | |
| *F01M 11/03* | (2006.01) | |
| *F16N 39/06* | (2006.01) | |
| *B01D 35/00* | (2006.01) | |

(52) U.S. Cl.
CPC .............. *B01D 35/30* (2013.01); *B01D 33/11* (2013.01); *B01D 35/1573* (2013.01); *B04B 5/005* (2013.01); *B04B 7/08* (2013.01); *F01M 11/03* (2013.01); *F16N 39/06* (2013.01); *B01D 35/005* (2013.01); *B01D 2201/40* (2013.01); *B01D 2313/02* (2013.01); *F16N 2039/065* (2013.01)

(58) Field of Classification Search
CPC .... B01D 35/30; B01D 33/11; B01D 35/1573; B01D 35/005; B01D 2201/40; B01D 2313/02; B01D 21/262; B04B 5/005; B04B 7/08; B04B 3/00; F01M 11/03; F01M 1/10; F01M 2001/1035; F16N 39/06; F16N 2039/065
See application file for complete search history.

*Primary Examiner* — Walter D. Griffin
*Assistant Examiner* — Shuyi S. Liu

(57) ABSTRACT

A rotary vessel for a filter assembly is rotatably mountable in a housing of the filter assembly and has a body having an open end, a cover receivable on the body to close the open end, and a releasable locking device that is manually operable to selectively lock and unlock the cover relative to the body.

8 Claims, 4 Drawing Sheets

ROTARY VESSEL WITH A RELEASABLE LOCKING DEVICE FOR A FILTER ASSEMBLY

CROSS-REFERENCE TO RELATED APPLICATIONS

This application is a continuation of U.S. patent application Ser. No. 17/657,693 having a US filing date 1 Apr. 2022, which is a divisional application of U.S. patent application Ser. No. 16/214,097 having a US filing date of 9 Dec. 2018, the US patent application claiming a priority date of 8 Dec. 2017 based on prior filed United Kingdom patent application No. GB 1720492.6, the entire contents of the aforesaid US patent applications and the aforesaid United Kingdom patent application incorporated herein by reference to the fullest extent permitted by the law.

BACKGROUND OF THE INVENTION

This invention relates to a rotary vessel for a filter assembly, such as a centrifugal filter assembly. The filter assembly may be a filter assembly for a vehicle.

Filter assemblies are known for removing contaminant particles from lubricating oil circuits of internal combustion engines. They are also known for separating particulate matter from liquids, as well as separating liquids of different densities from one another, in a variety of industrial processes. Typically, a filter assembly comprises a housing having a rotary vessel supported therein to spin about an axis of rotation. A working fluid from which a contaminant is to be removed, e.g. engine oil, is supplied at elevated pressure along the axis of rotation to the rotary vessel. Subsequently, the pressurised fluid is tangentially ejected from the rotary vessel such that the rotary vessel is caused to spin. As the working fluid flows through the spinning rotary vessel, denser contaminants or particles are separated therefrom by centrifugal force and retained in the rotary vessel, typically as a cake adhering to an interior surface of the rotary vessel. Ejected fluid drains to a sump.

As retained contaminant particles agglomerate in the rotary vessel, it is necessary to replace or service the rotary vessel at suitably regular intervals to ensure the continued cleaning effectiveness of the filter assembly. It is common that servicing of the rotary vessel requires its removal from the housing.

SUMMARY OF THE INVENTION

It is an object of the invention to improve upon and/or reduce a problem associated with one or more known arrangements.

In accordance with an aspect of the present invention there is provided a rotary vessel for a filter assembly, the rotary vessel being rotatably mountable in a housing of the filter assembly and comprising:
  a preferably cylindrical vessel body having an open end;
  a top cover receivable on the body to close the open end; and
  a releasable locking device that is manually operable to selectively lock and unlock the cover relative to the body.

Preferably, the cover is substantially flat and closes the body at its upper axial end.

In certain embodiments, the releasable locking device may comprise at least one radially moveable projection and at least one recess configured to receive the projection. One of the cover or the body may comprise the radially moveable projection and the other of the cover and the body may comprise the recess. Removal of the cover from the body may be prevented when the projection is received in the recess.

In certain embodiments, the body may comprise a bearing tube defining a central bore for receiving a spindle of the filter assembly such that the rotary vessel may rotate about a longitudinal axis of the spindle. The cover may include an aperture through which the spindle may protrude when the cover is received on the body. The releasable locking device may selectively lock the cover to the bearing tube.

In certain embodiments, the releasable locking device may comprise a bayonet fitting between the aperture and the bearing tube.

In certain embodiments, the aperture may comprise a non-circular keyway and the bearing tube may include radial protrusions. The radial protrusions may be shaped to be receivable through the keyway in a first rotational position of the aperture relative to the bearing tube. Engagement between the radial protrusions and the cover may prevent removal of the cover from the bearing tube in a second rotational position of the aperture relative to the bearing tube subsequent to the radial protrusions being received through the keyway.

In certain embodiments, the cover may comprise a first part and a second part. The first part may be rotatable relative to the second part. The first part may comprise the aperture. The second part may comprise a through-hole configured to receive the bearing tube.

In certain embodiments, either of the bearing tube and the aperture may comprise the at least one radially moveable projection, the at least one radially moveable projection may comprise one or more radially moveable lugs, and the other of the bearing tube and the aperture may comprise the at least one recess in which the one or more radially moveable lugs may be received to limit or inhibit relative rotation of at least a part of the cover relative to the body. The one or more radially moveable lugs may each comprise a ball plunger.

In other embodiments, the releasable locking device may selectively lock the cover to the body. The at least one radially moveable projection may comprise one or more levers provided on the cover, wherein the one or more levers may selectively engage the at least one recess. The at least one recess may comprise a groove on an inside surface of the body, and the one or more levers may selectively engage the groove. The one or more levers may comprise a first portion and a second portion. The first portion may meet the second portion at a pivot, wherein each second portion may selectively engage a part of the body. The one or more levers may be arranged on the cover such that upon insertion of the cover in the body interference between the first portion or each lever and the body may pivot the respective lever about the pivot so that the second portion may engage the part of the body. Each of the one or more levers may comprise a handle for facilitating pivoting of the respective lever to disengage the second portion from the part of the body.

In accordance with an aspect of the present invention there is provided a filter assembly comprising a housing, and the rotary vessel as described above, wherein the rotary vessel is rotatably mounted in the housing.

BRIEF DESCRIPTION OF THE DRAWINGS

Embodiments of the invention are further described hereinafter with reference to the accompanying drawings.

DESCRIPTION OF PREFERRED EMBODIMENTS

Figure 1:
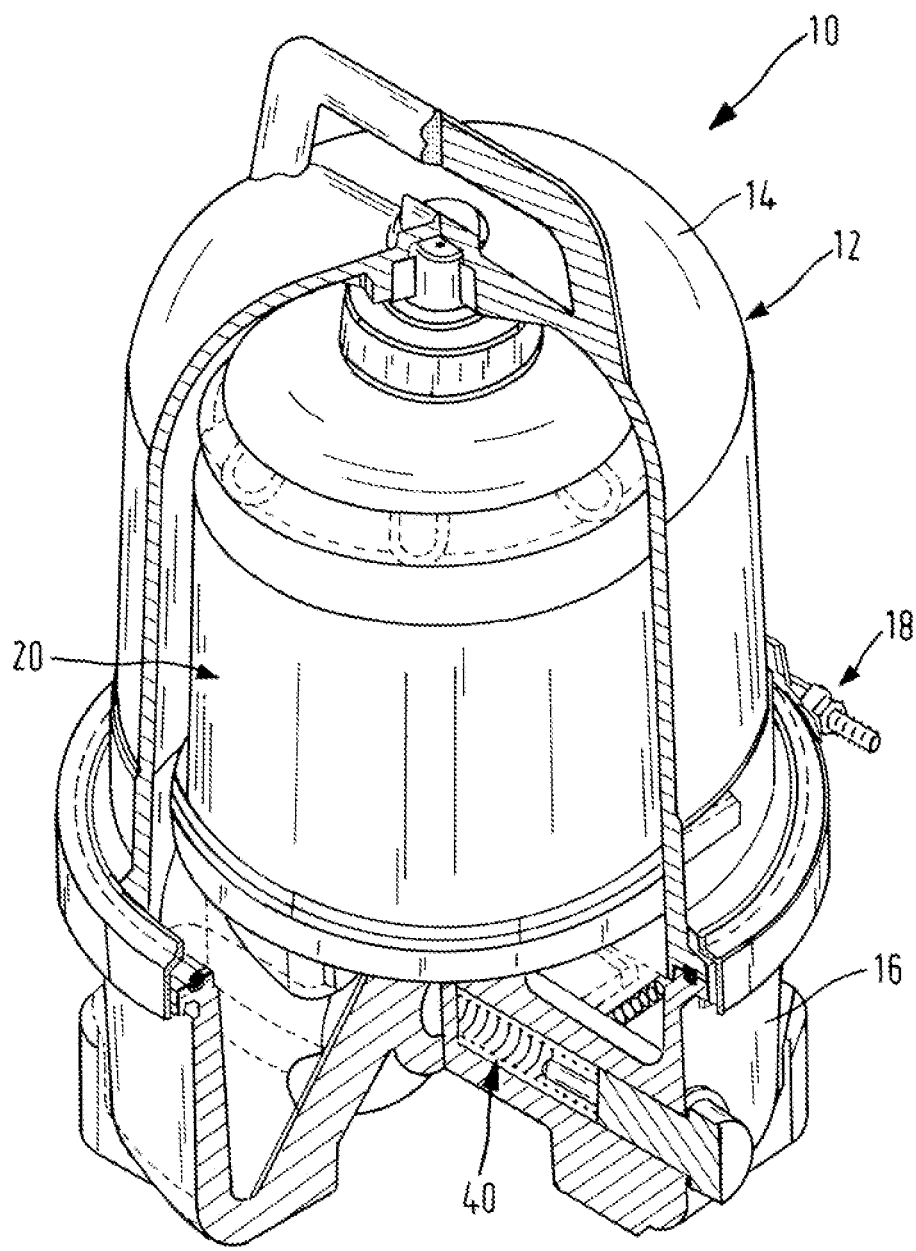
FIG. 1 shows a known filter assembly.

FIG. 1 shows a filter assembly 10. The filter assembly 10 has particular application in a motor vehicle, e.g. for cleaning engine oil in an engine lubrication system. However, other applications are contemplated, e.g. for use in oil recovery and in the manufacture of food products.

The filter assembly 10 comprises a housing 12 having a first housing part 14 and a second housing part 16. The first housing part 14 is removably attachable to the second housing part 16 (which is usually fixed on a vehicle or engine) and the first housing part 14 may be releasably secured to the second housing part 16 by a closure member 18, such as a hose clip, for example. One or more seals may be provided between the first housing part 14 and the second housing part 16 such that a fluid-tight connection may be made therebetween.

Figure 2:
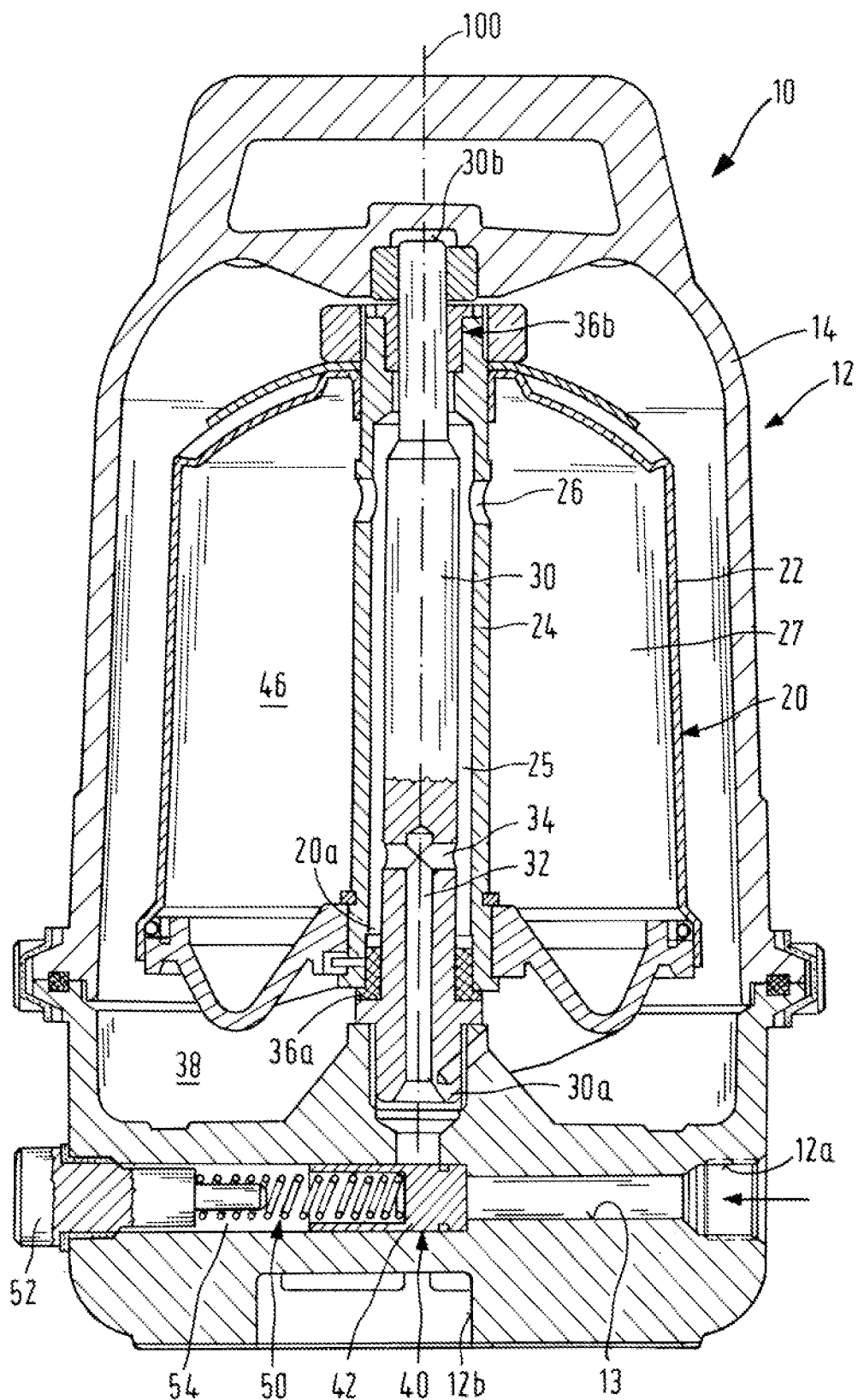
FIG. 2 shows a cross-sectional view of the filter assembly of FIG. 1.

As shown in FIG. 2, the filter assembly 10 further comprises a rotary vessel 20 having a rotor body 22 that is rotatable within the housing 12 about an axis of rotation 100. References herein to axial movement, axial extension, etc. relate to being at least generally parallel to the axis of rotation 100. References herein to radial movement, radial extension, etc. relate to being at least generally perpendicular to the axis of rotation 100.

The rotary vessel 20 defines a bearing tube 24 having a bore that receives a spindle 30 of the filter assembly 10. The spindle 30 extends along the longitudinal axis, which coincides with the axis of rotation 100, and has a bottom end 30a that is rotationally fixed relative to the housing 12 (in particular, the second housing part 16 in the embodiment shown in the Figures), and a top end 30b that is rotationally fixed relative to the housing 12 (in particular, the first housing part 14 in the embodiment shown in the Figures). The rotary vessel 20 is rotatably mounted to the spindle 30. In the non-limiting embodiment shown in the Figures, the rotary vessel 20 is rotatably mounted to the spindle 30 by a bottom bearing assembly 36a disposed towards the bottom end 30a of the spindle 30 and a top bearing assembly 36b disposed towards the top end 30b of the spindle 30. In alternative embodiments, the rotary vessel 20 may be rotatably mounted in the housing 12 by alternative means. For example, in certain embodiments, the spindle 30 may not be present, and, instead, the rotary vessel 20 may include a spigot at each of its top and bottom ends, where the spigots are journaled for rotation within the housing 12.

A bottom end of the bearing tube 24 defines a rotary vessel inlet 20a. The spindle extends through the rotary vessel inlet 20a into the bearing tube 24. The spindle 30 has a bore 32 extending from an opening in the bottom end 30a, and radial holes 34 fluidly connecting the bore 32 to an annulus 25 defined between the spindle 30 and the bearing tube 24. This arrangement permits a fluid to enter the annulus 25 through the rotary vessel inlet 20a via the bore 32.

A valve or valve assembly 40 is provided and is movable between a closed configuration and an open configuration. The housing 12 has a housing inlet 12a that is fluidly coupled to a channel 13 that is interrupted by the valve assembly 40 when it is in the closed configuration. When the valve assembly 40 is in the open configuration, the housing inlet 12a is fluidly connected to the rotary vessel inlet 20a by the channel 13. When the valve assembly 40 is in the closed configuration (as shown in FIG. 2), the valve assembly 40 fluidly seals the rotary vessel inlet 20a from the housing inlet 12a such that fluid may not enter the rotary vessel inlet 20a from the housing inlet 12a.

In the non-limiting embodiment shown in the Figures, the valve assembly 40 comprises a valve body 42 that is moveable in a valve channel 54 and biasing means 50 for biasing the valve body 42. In particular, the biasing means 50 (which may be a spring as illustrated in the Figures) bias the valve body 42 towards a first position in the channel 13 in which the valve assembly 40 is in the closed configuration. The valve body 42 is moveable against a biasing force provided by the biasing means to a second position in the channel 13 in which the valve assembly 40 is in the open configuration. The valve assembly 40 includes a stationary fitment 52 that provides an end stop to which the biasing means 50 is attached.

A fluid to be cleaned/filtered, e.g. engine oil, may be supplied to the filter assembly through the housing inlet 12a. If the pressure of the fluid entering the channel 13 through the housing inlet 12a has a pressure that is equal to or greater than a threshold pressure then the valve assembly 40 may move from the closed configuration to the open configuration. In relation to the embodiment shown in the Figures, the threshold pressure is defined as a pressure that is sufficient to move the valve body 42 from the first position to the second position against the biasing force provided by the biasing means 50.

With the valve assembly 40 in the open configuration, the housing inlet 12a is in fluid communication with the rotary vessel inlet 20a such that fluid entering the housing inlet 12a may flow into the annulus 25 through the bore 32. From the annulus 25, the fluid may flow under its own pressure through one or more radial holes 26 in the bearing tube 24 into a rotary vessel chamber 27 of the rotary vessel 20. The one or more radial holes 26 may extend through the bearing tube 24 substantially at right angles to the axis of rotation 100.

The rotary vessel 20 is self-powerable, i.e. the pressurised supply of fluid may drive rotation of the rotary vessel 20. To this end, the rotor body 22 may comprise one or more rotary vessel outlets 226 (FIG. 3) at the lower end face embodied as nozzles that are fluidly connected with the rotary vessel chamber 27. The one or more rotary vessel outlets 226 may each be provided at a radial distance from the axis of rotation 100 and configured such that the fluid exits the rotary vessel chamber 27, through the one or more rotary vessel outlets 226, in a direction generally tangential to the rotary vessel 20. As will be understood, the tangential emission of the fluid, at elevated pressure, results in a reactive force that causes rotation of the rotary vessel 20 about the axis of rotation 100. In certain embodiments, the one or more rotary vessel outlets 226 may each be provided with a nozzle or be otherwise shaped to provide an elevated pressure of the fluid exiting therethrough, thereby increasing the speed of rotation of the rotary vessel 20 in the housing.

As the fluid flows through the spinning rotary vessel 20, centrifugal force causes separation of contaminant material within the fluid. Separated contaminant material may accumulate within the rotary vessel chamber 27, primarily as a cake adhering to an interior surface of the rotary vessel chamber 27 or to a liner provided therein. The filtered fluid exits the rotary vessel 20 through the one or more rotary vessel outlets 226. The fluid exiting the rotary vessel 20 passes into a lower chamber 38 of the filter assembly 10 before draining to a sump and exiting the filter assembly 10 though a drain 12b of the housing that is fluidly connected to the lower chamber 38.

As contaminant accumulates within the rotary vessel chamber 46, the filter assembly 10 must be serviced, e.g. either to clean or replace the rotary vessel 20. To service the filter assembly 10, it may be necessary to remove the rotary vessel 20 from within the housing 12. Removal of the rotary vessel 20 from the within the housing 12 requires separation of the first housing part 14 from the second housing part 16.

Figure 3:
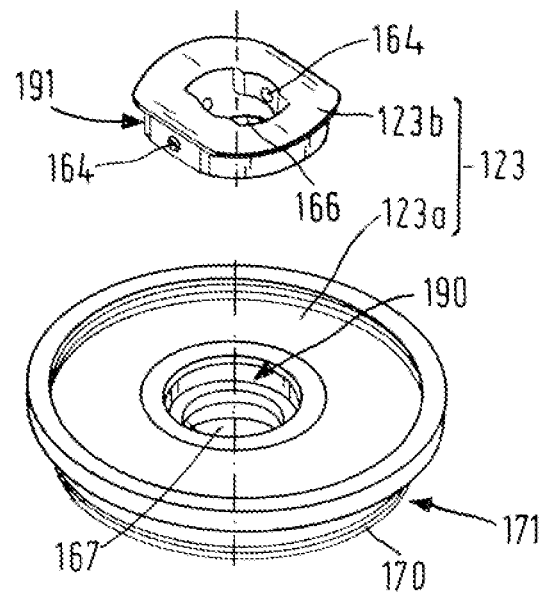
FIG. 3 shows a rotary vessel according to an embodiment of the present invention.
Figure 3:
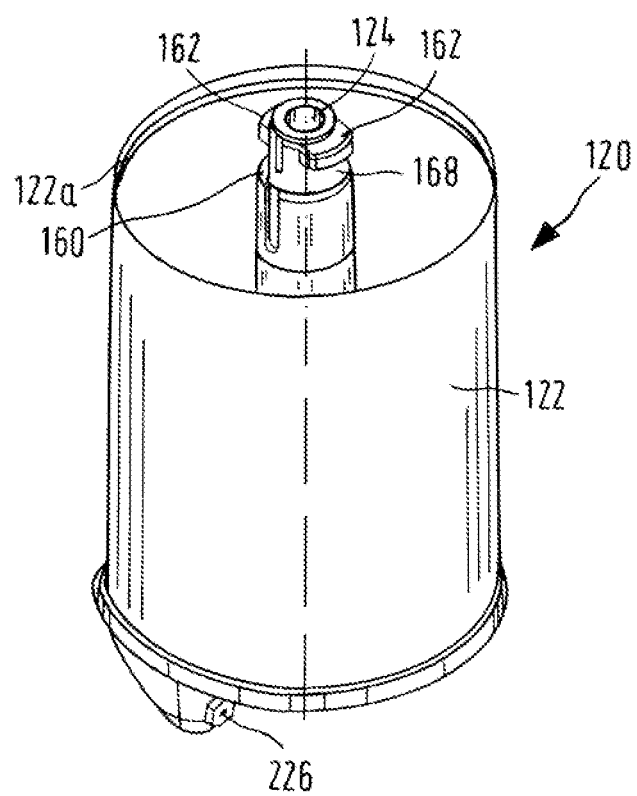

A rotary vessel 120 in accordance with an embodiment of the present invention is shown in FIG. 3. The rotary vessel 120 has a rotary vessel body 122 and a bearing tube 124 and functions in the same manner within a housing of a filter assembly as described above in relation to FIGS. 1 and 2. Additionally, the rotary vessel 120 has a removable cover 123 that is receivable on the rotary vessel body 122 to close an open end 122a of the rotary vessel body 122. That is, the cover 123 may be removed from the rotary vessel body 122 to permit access to the inside of the rotary vessel 120 and thereby permit cleaning and/or servicing of the rotary vessel 120. The rotary vessel 120 further includes a releasable locking device that is manually operable to selectively lock and unlock the cover 123 relative to the rotary vessel body 122. The term manually operable is used to specify that the cover 123 may be locked to and unlocked from the rotary vessel 120 without the use of any tools, i.e. locking/unlocking may be actuated by hand.

In the embodiment shown in FIG. 3, the cover 123 has a lower part 123a and an upper part 123b. The upper part 123b is configured to be received by the lower part 123a in a manner that permits rotation of the upper part 123b relative to the lower part 123a. In particular, the lower part 123a has a receiving portion 190 shaped to receive a first portion 191 of the upper part 123b so to permit the upper part 123b to rotate relative to the lower part 123a when received therein. In alternative embodiments, the upper part may be coupled to the lower part to prevent relative rotational movement between the upper part and lower part. In some embodiments, the upper part and the lower part may be formed monolithically.

In the embodiment shown in FIG. 3, the releasable locking device comprises a bayonet fitting. In particular, the upper part 123b of the cover 123 has an aperture 166 through which a spindle (as described above in relation to FIGS. 1 and 2) of the filter assembly may protrude when the cover 123 is received on the rotary vessel body 122. The lower part 123a of the cover 123 has a through-hole 167 through which the spindle may protrude when the cover 123 is received on the rotary vessel body 122, wherein the aperture 166 is axially aligned with the through-hole 167. In use, the lower part 123a of the cover 123 is positioned on the rotary vessel body 122, wherein the rotary vessel body 122 may be configured to limit the permitted downward travel of the lower part 123a relative to the bearing tube 124. The receiving portion 190 of the lower part 123a of the cover 123 is configured to limit downward travel of the upper part 123b relative to the lower part 123a. In some embodiments, a shoulder 160 on the bearing tube 124 may provide an abutment that limits the permitted downward travel of the cover 123 on the bearing tube 124.

The bearing tube 124 includes a pair of radial protrusions 162 defining a non-circular flange of the bearing tube 124. In alternative embodiments, the non-circular flange may be provided by other arrangements of radial protrusions. The aperture 166 of the upper part 123b has a shape that corresponds to the non-circular flange of the bearing tube 124. That is, the aperture 166 defines a keyway through which the radial protrusions 162 may pass axially when the upper part 123b of the cover 123 is in a predetermined rotational position (a "first rotational position") relative to the rotary vessel body 122. Once the radial protrusions 162 have passed through the aperture 166, the upper part 123b of the cover 123 is free to rotate relative to the rotary vessel body 122 to a second rotational position in which the radial protrusions 162 are no longer axially aligned with the keyway defined by the aperture 166 such that removal of the cover 123 from the rotary vessel body 122 is prevented.

The aperture 166 of the upper part 123b of the cover 123 is provided with a plurality of radially moveable lugs 164 and the bearing tube 124 comprises a plurality of recesses 168 in which the plurality of radially moveable lugs 164 may be received. Receipt of the plurality of radially moveable lugs 164 in the plurality of recesses 168 serves to limit or inhibit rotation of the upper part 123b of the cover 123 relative to the rotary vessel body 122 subsequent to the radial protrusions passing through and being axially clear of the aperture 166 (e.g. when in the second rotational position). In preferable embodiments, the radially moveable lugs each comprise a ball plunger that is biased radially inwardly from the aperture 166, but may be moved radially outwardly by the bearing tube 124 when the ball plunger is not axially aligned with one of the recesses 168. In some embodiments, the bearing tube may be provided with a plurality of radially moveable lugs and the aperture may comprise a plurality of recesses in which the plurality of radially moveable lugs may be received. In such embodiments, the radially moveable lugs may comprise a ball plunger that is biased radially outwardly from the bearing tube, yet may be moved radially inwardly by the aperture when the ball plunger is not axially aligned with one of the recesses.

Once engaged, the cover 123 is sealingly engaged with the rotary vessel body 122. One or more seals 170 may be provided between the cover 123 and the rotary vessel body 122 to make the connection fluid tight. In the embodiment shown in FIG. 3, the one or more seals 170 are provided in a seal recess 171 of the lower part 123a of the cover 123. The one or more seals 170 may be configured to rotationally fix the lower part 123a of the cover 123 relative to the rotary vessel body 122.

The cover 123 may be removed from the rotary vessel body 122 (e.g. when servicing the filter assembly) by manual rotation of the upper part 123b of the cover 123 relative to the rotary vessel body 122. In embodiments having ball plungers, each ball plunger may move radially outwardly and disengage from the respective recess 168 upon rotation of the upper part 123b of the cover 123, provided that the torque applied to the upper part 123b is above a threshold torque (which is preferably manually achievable).

Thus, the cover 123 may be manually locked and unlocked from the rotary vessel body 122.

Figure 4:
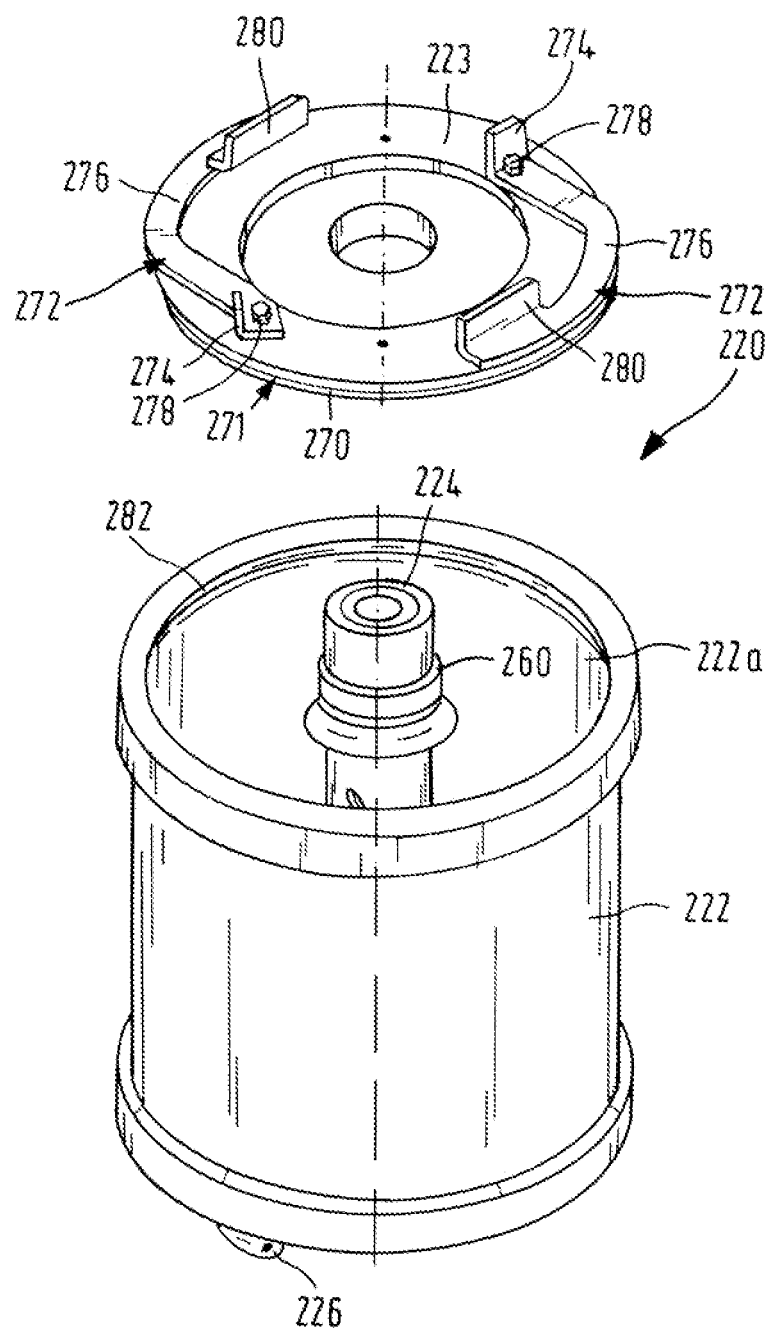
FIG. 4 shows a rotary vessel according to an alternative embodiment of the present invention.

FIG. 4 shows an alternative embodiment of a rotary vessel 220 in accordance with the present invention.

The rotary vessel 220 has a rotary vessel body 222 and a bearing tube 224 and functions in the same manner within a housing of a filter assembly as described above in relation to FIGS. 1 and 2. Additionally, the rotary vessel 220 has a removable cover 223 that is receivable on the rotary vessel body 222 to close an open end 222a of the rotary vessel body 222. That is, the cover 223 may be removed from the rotary vessel body 222 to permit access to the inside of the rotary vessel 220 and thereby permit cleaning and/or servicing of the rotary vessel 220. The rotary vessel 220 further includes a releasable locking device that is manually operable to selectively lock and unlock the cover 223 relative to the rotary vessel body 222. The term manually operable is used to specify that the cover 223 may be locked to and unlocked from the rotary vessel 220 without the use of any tools, i.e. locking/unlocking may be actuated by hand.

In the embodiment shown in FIG. 4, the releasable locking device comprises a pair of levers 272. The pair of levers 272 is provided on the cover 223 and each lever 272 is selectively engageable with a part of the rotary vessel body 222. In the specific embodiment shown in FIG. 4, the levers 272 are each engageable with a recess such as a circumferential groove 282 on an inside surface of the rotary vessel body 222.

Each lever 272 has a first portion 274 and a second portion 276, where the first portion 274 meets the second portion 276 at a pivot 278 such that the first portion 274 and the second portion 276 are each rotatable about the pivot 278. The second portion 276 of each lever is engageable with the groove 282 (or other part of the rotary vessel body 222).

Upon insertion of the cover 223 in the rotary vessel body 222 interference between the first portion 274 of each lever 272 and the rotary vessel body 222 causes pivoting the respective lever 272 about the pivot 278 so that the second portion 276 engages the groove 282. Once engaged, the cover 223 is sealingly engaged with the rotary vessel body 222. One or more seals 270 may be provided between the cover 223 and the rotary vessel body 222 to make the connection fluid tight. In the embodiment shown in FIG. 4, the one or more seals 270 are provided in a seal recess 271 of the cover 223. The one or more seals 270 may be configured to rotationally fix the cover 223 relative to the rotary vessel body 222.

A shoulder 260 on the bearing tube 224 provides an abutment that limits the permitted downward travel of the cover 223 on the bearing tube 224.

To remove the cover 223 from the rotary vessel body 222, the second portion 276 is pivoted away from the groove 282. To facilitate this operation, each lever 272 may be provided with a handle 280 (as shown in FIG. 4) to assist the pivoting of the second portion 276 away from the groove 282. When pivoting the second portion 276 away from the groove 282, the first portion 274 pivots towards the inside surface of the rotary vessel body 222. In certain embodiments, the part of the surface that is contacted by the first portion 274 may be shaped so as to provide a camming action between the lever 272 and the rotary vessel body 222 that may facilitate the upward movement (and therefore removal) of the cover 223 relative to the rotary vessel body 222.

In other embodiments, the releasable locking device may comprise any radially moveable projection capable of being received by a recess so that removal of the cover from the body is prevented when the projection is received in the recess. For example, one of the cover or the body may comprise the radially moveable projection and the other of the cover and the body may comprise the recess. Such an arrangement may permit a user to manually position the projection within the recess to selectively lock and unlock the cover relative to the body.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A rotary vessel for a filter assembly, the rotary vessel configured to be rotatably mounted in a housing of the filter assembly, the rotary vessel comprising:
   a vessel body having an open end;
   a cover receivable on the vessel body to close the open end; and
   wherein the vessel body comprises
      a bearing tube extending axially through an interior of the vessel body and defining a central bore configured to receive a spindle of the filter assembly such that the rotary vessel with the vessel body and the cover are rotatable about a longitudinal axis of the spindle;
      at least one recess arranged on the bearing tube;
   wherein the cover further comprises:
      an aperture, wherein the spindle protrudes through the aperture of the cover when the cover is received on the vessel body;
   a releasable locking device selectively locking and unlocking the cover to the bearing tube, comprising:
      at least one radially moveable projection on the cover including one or more radially moveable lugs arranged in the aperture of the cover;
   wherein the at least one recess is configured to receive the one or more radially moveable lugs;
   wherein the one or more radially moveable lugs, when received in the at least one recess, limits or inhibits a relative rotation of at least a part of the cover relative to the vessel body.

2. The rotary vessel according to claim 1, wherein the releasable locking device comprises:
   a bayonet fitting arranged between the aperture and the bearing tube.

3. The rotary vessel of claim 1, wherein the releasable locking device is moveable relative to the cover; relative to the vessel body; or relative to the cover and to the vessel body.

4. The rotary vessel of claim 2, wherein
the aperture is a non-circular keyway; and
the bayonet fitting comprises
  radial protrusions arranged at the bearing tube,
    wherein the radial protrusions are configured to pass through the keyway in a first rotational position of the aperture relative to the bearing tube, and
    wherein, subsequent to the radial protrusions having passed through the keyway, a rotation of the cover relative to the bearing tube into a second rotational position of the aperture relative to the bearing tube moves the radial protrusions into an engagement at the cover preventing a removal of the cover from the bearing tube.

5. The rotary vessel of claim 1, wherein
the cover comprises
  a first part and
  a second part,
    wherein the first part comprises
      the aperture and
    the second part comprises
      a through-hole configured to receive the bearing tube,
    wherein the first part is rotatable relative to the second part.

6. The rotary vessel of claim 1, wherein
the rotary vessel comprises
  a drive member comprising
    nozzles supplied with a liquid to be filtered from an axial bore of a spindle of the filter assembly,
    wherein the drive member is configured to rotate the rotary vessel by a reaction to a liquid emission from the nozzles.

7. The rotary vessel of claim 1, wherein
the one or more radially moveable lugs each comprises a ball plunger.

8. A filter assembly comprising
a housing and further comprising
  a rotary vessel of claim 1,
wherein the rotary vessel is rotatably mounted in the housing.

* * * * *